Dec. 16, 1958 M. B. HALL 2,864,582
FLUID PRESSURE OPERATED TOOL HAVING RELATIVELY
MOVABLE GRIPPING DEVICES
Filed May 14, 1953 3 Sheets-Sheet 1
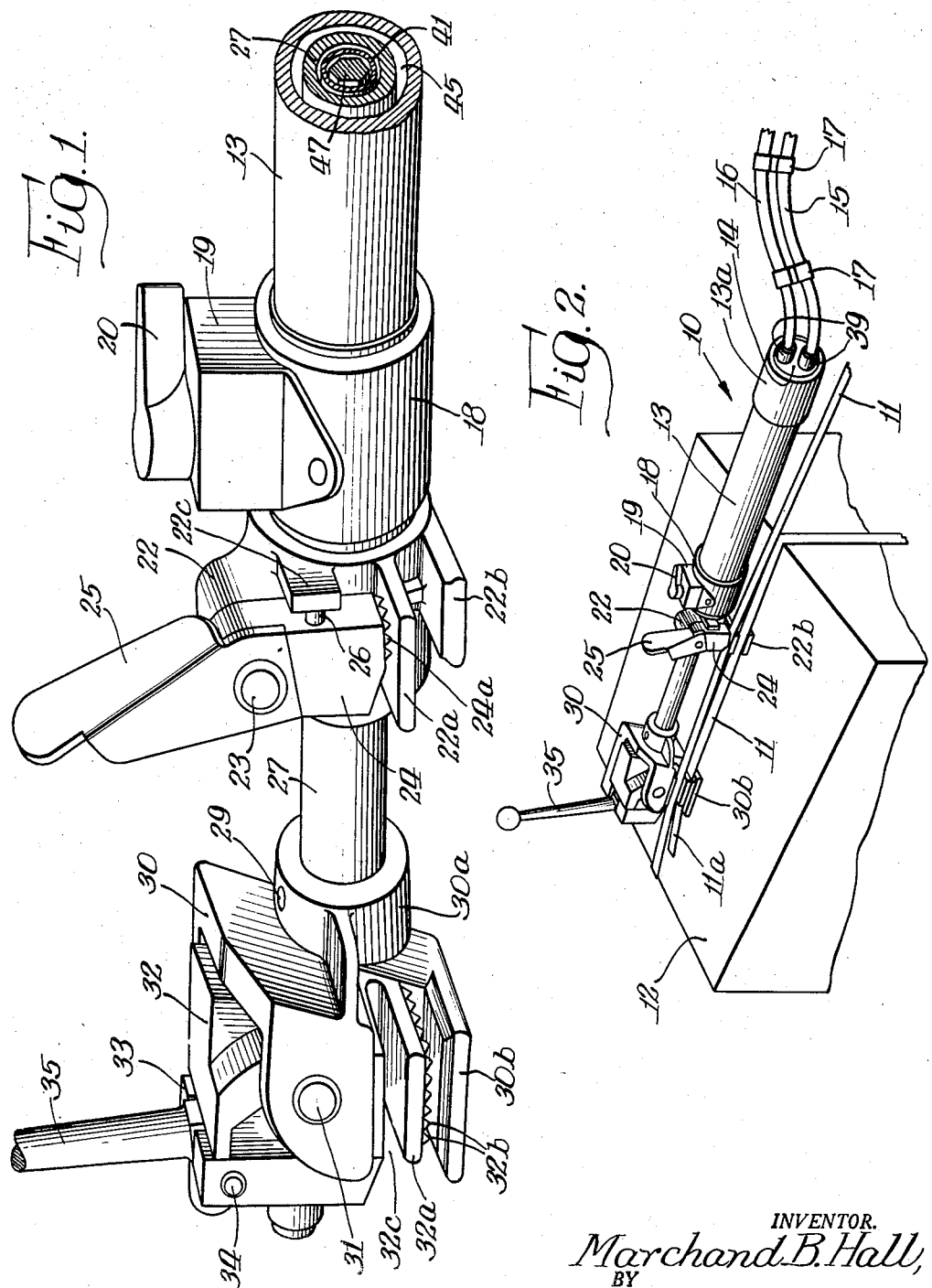
INVENTOR.
Marchand B. Hall,
BY
Smith, Olsen & Baird,
Attys.

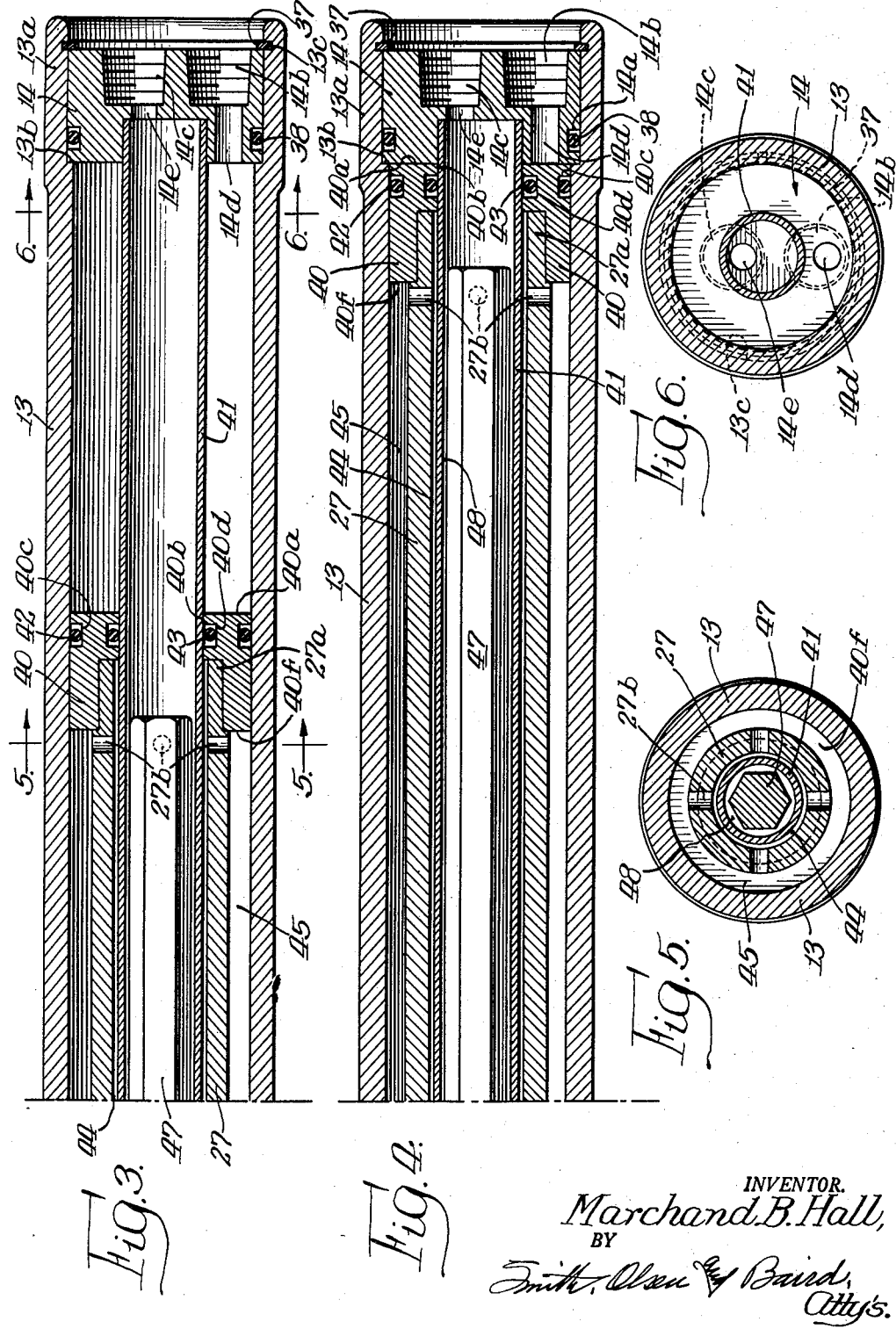

Dec. 16, 1958 M. B. HALL 2,864,582
FLUID PRESSURE OPERATED TOOL HAVING RELATIVELY
MOVABLE GRIPPING DEVICES
Filed May 14, 1953 3 Sheets-Sheet 3
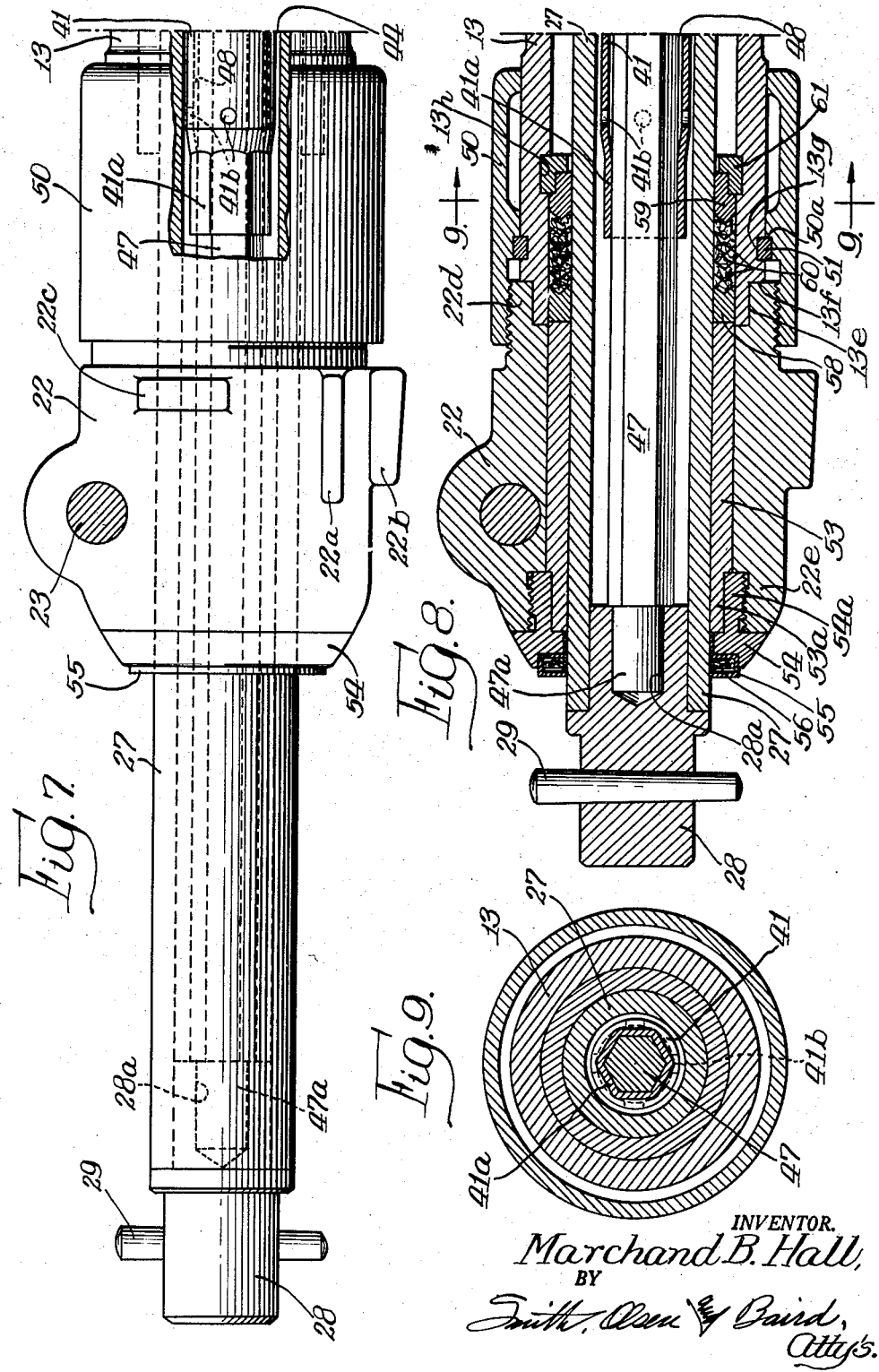
INVENTOR.
Marchand B. Hall,
BY
Smith, Olsen & Baird,
Attys.

United States Patent Office 2,864,582
Patented Dec. 16, 1958

2,864,582

FLUID PRESSURE OPERATED TOOL HAVING RELATIVELY MOVABLE GRIPPING DEVICES

Marchand B. Hall, Chicago, Ill., assignor to Acme Steel Company, Chicago, Ill., a corporation of Illinois Application May 14, 1953, Serial No. 354,958

6 Claims. (Cl. 254—51)

This invention relates to improvements in hydraulically actuated tools and its purpose is to provide an improved arrangement of the parts of such a tool and novel mechanism for effecting relative movement of some of said parts by hydraulic pressure.

The invention may be employed with particular advantage in the construction and operation of strap stretching tools, such as those which are commonly used in drawing metal straps taut around boxes, packages and the like. A tool of this type ordinarily comprises a pair of relatively movable gripping devices which are adapted to grip the opposite end portions of the strap extending around the object or group of objects to be bound and to be actuated so that their relative movement tightens the strap, whereupon the overlapping ends of the taut strap are secured together by a seal or the like. It is desirable, particularly when heavy strapping is being used, to actuate the tool by hydraulic pressure and this presents the problem of forming a tool which is simple and compact in construction so that it may be conveniently and efficiently handled and also the problem of preventing relative rotation of the parts which carry the gripping devices since it is important to maintain these devices in the same plane with each other and with the strap during the operation of tightening the strap.

The principal object of the present invention is to provide an improved strap stretching tool or the like comprising relatively movable parts actuated by hydraulic pressure which are restrained against rotation about the axis of their relative movement. Another object of the invention is to provide hydraulic actuating mechanism capable of use in a variety of tools for effecting relative linear movement of desired parts and comprising means for preventing rotation of those parts during their relative movement. A further object of the invention is to provide an hydraulically actuated tool having a novel arrangement of parts whereby it may be conveniently handled while connected to flexible fluid supply lines leading from a source of hydraulic pressure. Still another object is to provide an hydraulic ram having novel means for preventing rotation of the relatively movable parts and comprising a novel construction for preventing leakage of the hydraulic fluid. Other objects relate to various features of construction and arrangement which will appear more fully hereinafter.

The nature of the invention will be understood from the following specification taken with the accompanying drawings in which one embodiment is illustrated.

In the drawings,

Figure 1 shows a perspective view of a strap stretching tool embodying the present invention with the parts thereof being broken away;

Fig. 2 shows a perspective view of a complete strap stretching tool embodying the present invention and illustrating it in operative relation to a box or package about which a flexible binding strip is being drawn taut by the use of the tool;

Fig. 3 shows an enlarged vertical section through the right-hand portion of the tool illustrated in Fig. 2 with the operating piston in an extended position corresponding to the condition of the parts illustrated in Fig. 2;

Fig. 4 shows a vertical section similar to that of Fig. 3 with the piston and piston rod in their retracted positions;

Fig. 5 shows a transverse vertical section taken on the line 5—5 of Fig. 3;

Fig. 6 shows a sectional view taken on the line 6—6 of Fig. 3;

Fig. 7 shows an enlarged side elevation of the left-hand portion of the strap stretching tool illustrated in Fig. 1 with the left gripping device and other parts removed, a portion of the structure being broken away;

Fig. 8 shows an enlarged vertical section through the parts illustrated in Fig. 7 with the piston rod retracted; and Fig. 9 shows a vertical section taken on the line 9—9 of Fig. 8.

As illustrated particularly in Figs. 1 and 2 of the drawings, the invention is shown as being embodied in a strap stretching tool 10 which is shown as being used for drawing taut a metal binding strap 11 which is extended around a box or package 12. The strap stretching tool 10 comprises a cylinder 13 which contains certain operating parts of the tool and which serves also as a handle by which the tool may be manipulated when it is in use. This cylinder is enlarged at one end as shown at 13a and this enlarged portion is fitted by a relatively fixed plug 14 through which connections are made to flexible conduits 15 and 16, such as rubber hose or the like, which are preferably secured together by clips 17 so that they may be moved together as a unit when the tool 10 is transported from one position to another.

Adjacent the other end of the cylinder 13 there is mounted a sleeve 18 carrying a switch box 19 in which there is mounted electrically controlled switch mechanism operated by a handle 20 for controlling, by means not shown, the admission of compressed fluid to the supply conduits 15 and 16. On the end of the cylinder 13 adjacent to the sleeve 18 there is mounted a block 22 having two laterally projecting flanges 22a and 22b over which the strap 11 is adapted to pass. This block has pivotally mounted thereon by a pin 23 a gripping dog 24 having a serrated gripping surface 24a adapted to coact with the upper surface of a strap seated on the flange 22a. This gripping dog is adapted to be actuated by a handle 25 and may be elevated against the compression of a spring pressed plunger 26 mounted in a projection 22c of the block so that it is normally moved toward the flange 22a to grip the strap.

A hollow piston rod 27 is slidably mounted within the cylinder 13 and the block 22, as hereinafter described, and the forward end of this hollow piston rod has secured therein a connecting member 28 which is secured by a vertical pin 29 in the end of a sleeve 30a formed on the end of a block 30. This block has a flange 30b over which the strap 11 is adapted to pass and it is provided with spaced walls engaged by a pivot pin 31 on which there is pivotally mounted a gripping dog 32. This gripping dog has a horizontal flange 32a provided with a serrated gripping surface 32b on its under side for engagement with a strap 11 seated upon the flange 30b. The block 31 carries a strap shearing device 33 and has mounted therein a pivot pin 34 upon which there is pivotally mounted an operating handle 35 adapted to effect upward and downward movement of the shearing blade 33 and to effect the release of the gripping dog 32 against the compression of a spring not shown. This construction is described and claimed in my copending application Serial No. 354,959, filed May 14, 1953.

In the use of the strap stretching tool described above in the manner shown in Fig. 2, the tool is placed over the box or package 12 with the flanges 22b and 30b resting upon the top surface of the package. The end portion of the strap 11 is then extended over the flange 30b with the free end 11a of the strap extending beyond this flange and the strap is then extended over the flange 22b and around the box or package. Upon being brought up at the end of the package adjacent the block 30, the strap is carried through a slot 32c which is formed in the dog 32 above the flange 32a and this supply portion of the strap is then extended over the flange 22a with the gripping dog 24 in its elevated position. The handle 25 is then released to allow the gripping dog 24 to move into engagement with the supply portion of the strap and, with the extremity of the strap held against the flange 30b by the gripping dog 32, the parts are in readiness for the relative movement of the two gripping devices which include the blocks 22 and 30. This action is effected by the admission of compressed fluid to the cylinder 13, in the manner hereinafter described, and this results in the separation of the gripping dogs and of the blocks 22 and 30, so that the extremity of the strap is moved toward the left as viewed in Fig. 2 with the supply portion of the strap sliding over the flange 32a of the gripping dog 32. When the desired taut condition has been created in the strap 11, the extremity 11a of the strap may be united with the overlying supply portion of the strap by means of a suitable metal seal or the like and the gripping dogs 24 and 32 may then be released from the strap and the piston rod 27 may be retracted to a position where the block 30 lies adjacent to the block 22.

Having described the general structure and operation of the invention when embodied in a strap stretching tool, a more detailed description will now be given of the mechanism by which the relative movement of the gripping devices is effected.

Referring particularly to Figs. 3 and 4 of the drawings, it will be seen that the plug 14 which forms the end wall of the cylinder 13 is secured in position against a shoulder 13b at the inner end of the enlarged portion 13a of the cylinder by means of a retaining ring 37 which fits within an annular groove 13c formed in the end of the cylinder. The plug 14 is provided with an annular groove 14a in which there is mounted a sealing ring 38 adapted to form a fluid-tight connection with the cylinder wall. The plug 14 is further provided with two sockets 14b and 14c which are adapted to be readily engaged by coupling members 39 to which the supply conduits 15 and 16 are connected. From one of these sockets 14b a passage 14d communicates with the interior of the cylinder 13 adjacent the end face 40a of a piston 40 which is slidably mounted in the cylinder and rigidly secured to the extremity 27a of the hollow piston rod 27. From the other socket 14c, a passage 14e formed in the plug 14 communicates with the interior of a tube 41 which is slidably engaged by the wall of an aperture 40b formed in the piston. The piston is provided with an annular groove 40c engaged by a sealing ring 42 which is adapted to form a fluid-tight connection between the piston and the inner wall of the cylinder 13. The piston 40 is also provided with an annular groove 40d in which there is mounted a sealing ring 43 adapted to form a fluid-tight connection between the inner wall of the piston and the outer surface of the tube 41.

The tube 41 is arranged to extend throughout a substantial part of the length of the cylinder 13, its length being greater than the normal travel of the piston rod 27 during the strap stretching operation and this tube is spaced inwardly from the hollow piston rod 27 to form an annular air space 44 through which compressed fluid which enters the tube 41 from the passage 14e may travel in the opposite direction through the passage 44, as hereinafter described, to be admitted outwardly through the ports 27b formed in the hollow piston rod into the annular space 45 between the hollow piston rod and the wall of the cylinder where it may act against the inner end face 40f of the piston. The action of compressed fluid on this end face of the piston 40 is adapted to move the piston and the piston rod to the retracted position shown in Fig. 4 while the admission of compressed fluid to the end face 40a of the piston through the passage 14d is adapted to move the piston 40 to the extended position shown in Fig. 3.

The connecting member 28 which is secured in the forward end of the hollow piston rod 27, and which acts to close that end of the piston rod, is provided with a tubular bore 28a in which there is secured the cylindrical extremity 47a of a solid rod 47 of hexagonal cross section which extends longitudinally of the cylinder 13 within the hollow piston rod 27 and into the tube 41. When the block 30 is in its retracted position, the rod 47 extends nearly to the right-hand end of the tube 41 adjacent to the plug 14. In all relative positions of the blocks 22 and 30, the hexagonal rod 47 has a sliding fit with the end portion 41a of the tube 41. This end portion has a corresponding hexagonal cross section so that it restrains the rod 47 and parts connected thereto against rotation about the longitudinal axis of the relative movement of the blocks 22 and 27 so that when this relative movement takes place the flanges 22b and 30b are maintained in the same plane and in the plane of the top surface of the box or package 12. The diameter of the body portion of the tube 41 is slightly greater than the greatest transverse dimensions of the hexagonal rod 47, thus providing a space 48 around the rod through which the compressed fluid passing through the tube 41 from the passage 14e may move outwardly through the radial ports 41b which are formed in the tube 41 adjacent to the hexagonal portion 41a thereof. Thus, the compressed fluid, such as oil or the like, may move outwardly through the ports 41b into the annular passage 44 from which it flows through the ports 27b to the end face 40f of the piston as previously described.

The block 22 is secured upon the adjacent end of the cylinder 13 by a sleeve 50 which is internally threaded for engagement with a circular flange 22d formed on the block 22. This flange fits over the reduced end portion 13e of the cylinder and is adapted to abut against an annular shoulder 13f. The cylinder is further provided with an annular groove 13g in which there is mounted a split ring 51 adapted to be engaged by an annular seat 50a formed on the sleeve 50 when the sleeve 50 is in the normal position shown in Figs. 7 and 8, whereby the cylinder 13 is rigidly secured to the block 22.

The hollow piston rod 27 is mounted to slide in a bushing 53 mounted in the block 22 and, at the left-hand end of this block, the bushing is held in position by a collar 54 having a flange 54a which threadedly engages an internally threaded flange 22e formed on the block. This flange 54a is engaged by the reduced extremity 53a of the bushing. The collar 54 has secured thereto a casing 55 which contains a sealing ring 56 adapted to form a fluid-tight connection between the collar and the reciprocating hollow piston rod 27 which extends therethrough.

At the end of the bushing 53 opposite to the collar 54, there is a packing chamber formed around the hollow piston rod 27 with two packing rings 58 and 59 mounted at the opposite ends thereof. These packing rings are provided with complementary V-shaped depressions and projections which correspond to the formation of a plurality of compressible rings 60 of leather or the like which are mounted between them and which are adapted to be compressed when the bushing 53 has been moved to its normal position by the rotation of the collar 54. The innermost packing ring 59 seats against a collar 61 of angular cross section which is mounted in an annular groove 13h formed in the inner wall of the cylinder 13. By this means, a fluid-tight connection is established between the hollow piston rod 27 and the cylinder 13 adjacent to the block 22.

In the operation of the tool described above, the admission of compressed fluid, such as oil or the like, through the supply conduit 15 will cause a forward stroke of the piston 40 due to the application of the fluid pressure through the passage 14d against the end face 40a of the piston. This will result in a forward motion of the piston and the piston rod 27 from the position shown in Fig. 4 toward the position shown in Figs. 2 and 3, with a resulting separation of the blocks 22 and 30 and a consequent tightening of the strap 11 drawn around the package 12. When this tightening operation has been carried to the desired extent, the fluid pressure applied through the conduit 15 may be shut off and fluid pressure admitted through the conduit 16 with the result that this fluid will flow through the passage 14e and thence through the tube 41, the ports 41b, the space 44, and the ports 27b to the space 45 where it is applied against the end face 40f of the piston 40, with a consequent return stroke of the piston. The application of fluid pressure to the faces of the piston 40 is adapted to be controlled by a suitable solenoid operated valve mechanism controlled by a circuit operated by the switches contained in the casing 19 and actuated by the switch lever 20, but these features need not be described since they do not in themselves constitute any part of the present invention.

From the foregoing description it will be apparent that the present invention provides improved mechanism, capable of being embodied in strap stretching tools or other tools, whereby relative linear movement of gripping devices or other operating devices may be effected by fluid pressure without relative rotation of these devices and that this advantage is obtained without any difficulties arising from the leakage of the fluid by reason of the fact that the means for preventing relative rotation is located entirely within the cylinder containing the mechanism for effecting the relative movement. This advantage is obtained in conjunction with others, including the compact and novel arrangement whereby the fluid connections for effecting relative movement of the devices in both directions are made at one end of the assembly so that the tool may be conveniently manipulated when in use.

Although one form of the invention has been shown and described by way of illustration, it will be understood that it may be constructed in various other embodiments which come within the scope of the appended claims.

I claim:

1. The combination in apparatus of the class described, of a pair of separate gripping devices, a cylinder carrying one of said devices, a piston mounted to reciprocate in said cylinder, a hollow piston rod connected to said piston and carrying the other of said devices, means for admitting compressed fluid to said cylinder on either side of said piston to effect relative linear movement of said devices toward and from each other, a second rod secured in and movable with said piston rod, and means carried by said cylinder for engaging said second named rod and preventing rotation of said cylinder about said second named rod.

2. The combination in apparatus of the class described, of a pair of separate gripping devices, a cylinder carrying one of said devices, a piston mounted to reciprocate in said cylinder, a hollow piston rod connected to said piston and carrying the other of said devices, means for admitting compressed fluid to said cylinder to effect relative linear movement of said devices, a second rod secured in and movable with said piston rod, and a tube secured to said cylinder and having an interlocking sliding engagement with said second named rod to prevent rotation thereof.

3. The combination in apparatus of the class described, of a pair of separate gripping devices, a cylinder carrying one of said devices, a piston mounted to reciprocate in said cylinder, a hollow piston rod connected to said piston and carrying the other of said devices, means for admitting compressed fluid to said cylinder to effect relative linear movement of said devices, a second rod of noncircular cross section secured in and movable with said piston rod, and a tube secured to said cylinder and having a part slidably fitted by said second named rod to prevent rotation of said second named rod and said piston rod.

4. The combination in apparatus of the class described, of a pair of separate strap gripping devices, a cylinder carrying one of said devices, a piston mounted to reciprocate in said cylinder, a hollow piston rod connected to said piston and carrying the other of said devices, a plug closing one end of said cylinder, a tube fixed in said plug and extending into said piston rod, the outer surface of said tube and the inner surface of said piston rod having a space therebetween, said piston being slidably mounted on said tube, said piston rod and said tube having apertures in their walls to provide with said space a communicating passage between the interior of said tube and one face of said piston, said plug having a passage therethrough communicating with the other face of said piston and another passage communicating with the interior of said tube, and means for supplying compressed fluid to each of said last mentioned passages independently of the other.

5. The combination in apparatus of the class described, of a pair of separate strap gripping devices, a cylinder carrying one of said devices, a piston mounted to reciprocate in said cylinder, a hollow piston rod connected to said piston and carrying the other of said devices, a plug closing one end of said cylinder, a tube fixed in said plug and extending into said piston rod, the outer surface of said tube and the inner surface of said piston having a space therebetween, said piston being slidably mounted on said tube, said piston rod and said tube having apertures in their walls to provide with said space a communicating passage between the interior of said tube and one face of said piston, said plug having a passage therethrough communicating with the other face of said piston and another passage communicating with the interior of said tube, means for supplying compressed fluid to each of said last mentioned passages independently of the other, and means for forming fluid-tight connections between said piston and said cylinder and between said piston and said tube.

6. The combination in apparatus of the class described, of a pair of separate strap gripping devices, a cylinder carrying one of said devices, a piston mounted to reciprocate in said cylinder, a hollow piston rod connected to said piston and carrying the other of said devices, means for admitting compressed fluid to said cylinder to effect relative linear movement of said devices, a second rod of hexagonal cross section secured within and movable with said piston rod, a plug fixed in one end of said cylinder, and a tube secured to said plug and extending into said cylinder through said piston and around said second rod, said tube having a part of hexagonal cross section with which said second rod has a sliding fit.

References Cited in the file of this patent

UNITED STATES PATENTS

| | | |
|---|---|---|
| 298,224 | Morgan | May 6, 1884 |
| 547,459 | Seymour | Oct. 8, 1895 |
| 639,815 | King | Dec. 26, 1899 |
| 1,208,115 | Eynon | Dec. 12, 1916 |
| 1,264,727 | White | Apr. 30, 1918 |
| 1,888,834 | Puleo | Nov. 22, 1932 |
| 2,249,078 | Fox | July 15, 1941 |
| 2,383,061 | Johnson | Aug. 21, 1945 |
| 2,391,644 | Schmidt | Dec. 25, 1945 |
| 2,459,393 | Raniville | Jan. 18, 1949 |
| 2,497,813 | Darr | Feb. 14, 1950 |
| 2,612,140 | Miller | Sept. 30, 1952 |
| 2,681,789 | Nichols | June 22, 1954 |